May 26, 1970        KEIJI MATSUKI        3,514,185

MICROSCOPE OBJECTIVE OF HIGH RESOLVING POWER

Filed Jan. 20, 1967

United States Patent Office 3,514,185
Patented May 26, 1970

3,514,185
MICROSCOPE OBJECTIVE OF HIGH
RESOLVING POWER
Keiji Matsuki, Tokyo, Japan, assignor to Nippon Kogaku
K.K., Tokyo, Japan, a corporation of Japan
Filed Jan. 20, 1967, Ser. No. 610,583
Claims priority, application Japan, Jan. 24, 1966,
41/3,698
Int. Cl. G02b 21/02, 11/34
U.S. Cl. 350—176       2 Claims

ABSTRACT OF THE DISCLOSURE

A microscope objective comprising a front convergent group having a positive Petzval sum and a rear divergent group having a negative Petzval sum. The rear group comprises a first and second divergent members, the first member consisting of a positive meniscus single lens element and a negative biconcave single lens element, and the second member consisting of a negative biconcave single lens element and a positive biconvex single lens element. In order to correct the Petzval sum, the first and second members act as a thick meniscus component and the air space between the two elements of the second member acts as meniscus air lens.

---

Figure 1:
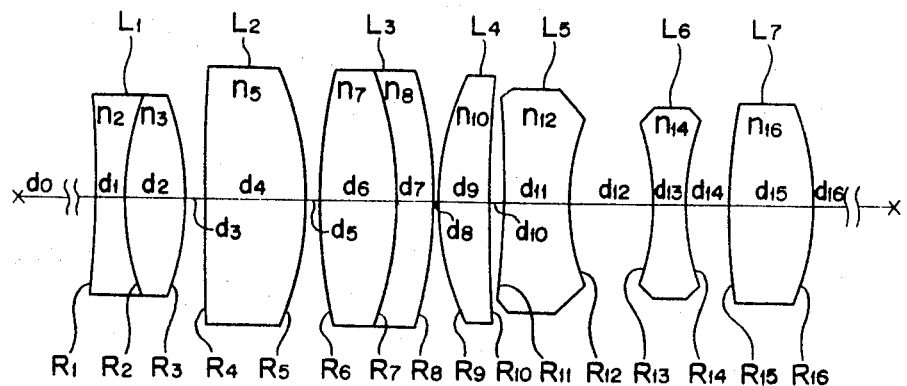

This invention relates to an objective lens for microscopes.

The lens system of the present invention provides four lenses, or groups of lenses, on the image side of a meniscus lens of large axial thickness wherein the axial thickness of the lenses, the air space distance between pairs of lenses and the radius of the last lens surface are so related to the focal length of the system to provide correction for curvature of field and correct to a high degree for chromatic, spherical and coma aberrations.

In general, an objective lens for microscopes of high resolving power requires a large numerical aperture. For this reason, in the case of an objective lens of the Petzval type generally adopted, a considerable amount of curvature of field is unavoidable and it is impossible to obtain a flat image over the entire view. In order to remove this curvature defect and obtain a plane image it has been customary to reduce the Petzval sum of the system by using a meniscus lens of large axial thickness in the lens system. Objectives of this type have been developed. However, in the case of a lens system wherein a thick meniscus lens is employed, it is possible to correct the curvature of field, but in most such cases, the chromatic aberration and in particular the spherical aberration caused by color is increased, with considerable bad effects in coma aberration.

It is therefore the object of the present invention to provide an objective lens for microscope overcoming the above-mentioned defects.

In accordance with the present invention, an optical system is provided comprising four lenses or lens groups on the image side of an objective lens, and by related conditions hereinafter given, an objective lens is provided wherein the working distance, i.e. the distance between the front lens and the object, is great, and a flat image obtained, at the same time correcting to a high degree for chromatic aberration, coma aberration, astigmatism, distortion and the like.

Figure 2:
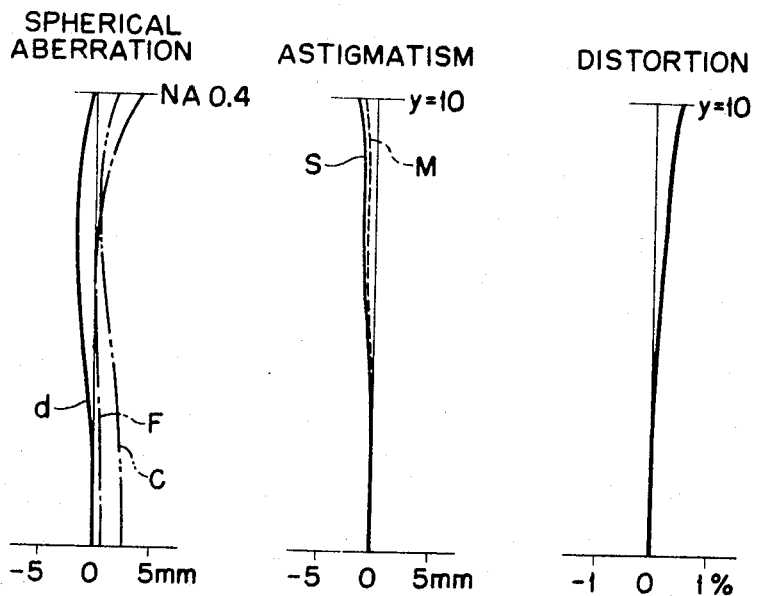

Other objects, advantages and features of the present invention will be more apparent from the following description of an illustrative embodiment shown in the drawing in which:

FIG. 1 is a cross sectional view of an illustrative embodiment of the present invention; and FIG. 2 is a diagram showing aberration curves of the illustrated embodiment.

The lens system of the present invention as illustrated in FIG. 1, comprises a positive lens preferably a positive meniscus lens $L_1$ which is concave on the side of the object, and lenses $L_2$ and $L_3$ which are positive lenses. Of the first three lenses $L_1$, $L_2$ and $L_3$, at least one of the lenses is a cemented lens, which plays a role for correcting chromatic aberration. However, such a combination of lenses $L_1$, $L_2$ and $L_3$ is known in the art. According to the present invention lenses $L_4$ and $L_7$ are the positive lenses, while lenses $L_5$ and $L_6$ are both bi-concave negative lenses. The axial air space $d_{12}$ between lenses $L_5$ and $L_6$ is larger than the axial thickness $d_{13}$ of the lens $L_6$. The thickness of the lenses and axial air spaces ($d$) between lenses and the radii (R) of the lens surfaces are as indicated on the drawing. The axial air space $d_0$ designates the distance between the front lens, i.e. $L_1$ and the object and this is called the working distance as aforementioned, and the axial air space $d_{16}$ designates the distance between the last lens, i.e. $L_7$, and the image.

We have successfuly obtained a lens system wherein the respective aberrations are corrected to a high degree by incorporating the following related conditions:

(I)     $0.2f < d_9 < 0.3f$
(II)    $0.4f < d_9 + d_{11} < 0.65f$
(III)   $0.1f < d_{14} < 0.3f$
(IV)    $1.15f < |R_{16}| < 2f$
(V)     $0.04f < d_{10} < 0.07f$ wherein $f$ is the focal length of the whole system; $d_9$, $d_{10}$, $d_{11}$ and $d_{14}$ represent, respectively, the axial thickness of the lens $L_4$, the axial air space between lenses $L_4$ and $L_5$, the axial thickness of the lens $L_5$ and the axial air space between lenses $L_6$ and $L_7$, while $R_{16}$ is the radius of curvature of the rear surface of the lens $L_7$.

The condition (I) is indispensable for correcting coma which causes the deterioration of the image outside of axis. The light is strongly refracted by the action of the radius of curvature $R_9$ of the lens $L_4$ to pass through the lens $L_4$ having a central thickness $d_9$. Within the lens $L_4$, the sine condition which has a close relation with coma, is significantly varied. The condition (I) is determined to this end. When the upper limit is exceeded, the sine condition is deteriorated to negative, and when the lower limit is exceeded, the sine condition is deteriorated to positive. The condition (II) is necessary for correcting coma and also plays a role together with the condition (III) for correcting the image surface curvature. The condition (II) takes into consideration that a meniscus lens having a large central thickness is constituted by lenses $L_4$ and $L_5$ and the condition (III) considers the air space $d_{14}$ as a meniscus air lens. These conditions play a role in decreasing the Petzval sum to a minimum and obtaining a flat image surface. However, when a thick meniscus lens is used, the spherical aberration and coma deteriorated due to color, so that the central thickness of a meniscus lens should be limited within a practical range. The upper and lower limits of conditions (II) and (III) take into consideration this fact.

Condition (IV) is determined to avoid the deterioration of spherical aberration. The radius of curvature $R_{16}$ is the rearmost curvature and is determined to correct the remaining aberrations after the other elements ($R_1$, $d$ and $n$) have been determined. The condition (IV) is therefore determined to correct the spherical aberration on the basis of practical use. When condition (IV) is not satisfied, the spherical aberration becomes large and this can hardly be corrected by the other elements. The condition (V) is indispensable for removing spherical aberration due to color. The light rays from the lens $L_5$ have a strong positive refractive power and incident into the air space $d_{10}$ receive quite a different refractive power relative to the differences of wave lengths, which constitutes an important factor for determining the balance in spherical aberrations of C-line and F-line. When the upper limit of $d_{10}$ is exceeded aberration of C-line is deteriorated, and when the lower limit of $d_{10}$ is exceeded aberration of F-line is deteriorated.

Table 1 shows the embodiment of the objective lens (20× NA 0.4), and the respective notations R, $d$, $n_d$, and $\nu_d$ stands for the radius of curvature of lens element, axial thickness of element and air spaces between elements, the refractive index of glass of element and air space between adjacent elements against $d$ line, and Abbe number, respectively. The focal length of the whole system of this embodiment is 8.1417 mm.

Table 2 shows Seidel aberration coefficients and the sums of the coefficients of the respective surfaces for showing the state of correction of aberration, and which are the values on the side of the object when the focal length of the lens is set to be 1 mm.

TABLE 1
$f = 8.1417$

| R | d | $n_d$ | $\nu_d$ |
|---|---|---|---|
| | $d_0 = 5.0149$ | $n_1 = 1.0$ | |
| $R_1 = -46.9514$ | | | |
| | $d_1 = 1.15$ | $n_2 = 1.44628$ | 67.2 |
| $R_2 = 11.0132$ | | | |
| | $d_2 = 2.17$ | $n_3 = 1.43386$ | 94.9 |
| $R_3 = -8.6654$ | | | |
| | $d_3 = 0.69$ | $n_4 = 1.0$ | |
| $R_4 = 464.2827$ | | | |
| | $d_4 = 3.5$ | $n_5 = 1.71300$ | 53.9 |
| $R_5 = -13.5484$ | | | |
| | $d_5 = 0.64$ | $n_6 = 1.0$ | |
| $R_6 = 25.7478$ | | | |
| | $d_6 = 2.76$ | $n_7 = 1.79668$ | 45.3 |
| $R_7 = -10.4$ | | | |
| | $d_7 = 1.29$ | $n_8 = 1.80518$ | 25.5 |
| $R_8 = -21.8695$ | | | |
| | $d_8 = 0.05$ | $n_9 = 1.0$ | |
| $R_9 = 10.65$ | | | |
| | $d_9 = 1.99$ | $n_{10} = 1.71300$ | 53.9 |
| $R_{10} = 86.5722$ | | | |
| | $d_{10} = 0.41$ | $n_{11} = 1.0$ | |
| $R_{11} = -35.9346$ | | | |
| | $d_{11} = 2.42$ | $n_{12} = 1.80518$ | 25.5 |
| $R_{12} = 8.9307$ | | | |
| | $d_{12} = 2.9$ | $n_{13} = 1.0$ | |
| $R_{13} = -8.1872$ | | | |
| | $d_{13} = 1.3$ | $n_{14} = 1.74950$ | 35.0 |
| $R_{14} = 12.2654$ | | | |
| | $d_{14} = 1.47$ | $n_{15} = 1.0$ | |
| $R_{15} = 33.6828$ | | | |
| | $d_{15} = 2.89$ | $n_{16} = 1.79631$ | 40.9 |
| $R_{16} = -11.4213$ | | | |
| | $d_{16} = 153.2026$ | $n_{17} = 1.0$ | |

In the above table $n_1$, $n_4$, $n_6$, $n_9$, $n_{11}$, $n_{13}$, $n_{15}$ and $n_{17}$ denote the refractive index of air spaces between adjacent lens elements although not shown in the drawing.

TABLE 2.—SEIDEL COEFFICIENTS

| | I | II | III | IV | V |
|---|---|---|---|---|---|
| 1 | 0.0894 | 0.0439 | 0.3808 | 0.3376 | 0.1660 |
| 2 | 0.4538 | −0.9488 | 4.8698 | 1.6947 | −3.1698 |
| 3 | −0.7184 | 1.0694 | −5.0599 | −1.8762 | 2.7929 |
| 4 | −0.1682 | −0.2191 | −1.2826 | −0.7116 | −0.9272 |
| 5 | −0.0127 | 0.0252 | −0.5567 | −0.4566 | 0.9068 |
| 6 | −0.7799 | −1.2437 | −6.0509 | −2.0843 | −3.3238 |
| 7 | 0.3775 | 0.7324 | 4.2235 | 1.3817 | 2.6807 |
| 8 | −0.0111 | 0.0135 | 0.2687 | 0.3017 | −0.3678 |
| 9 | 0.2510 | 0.4934 | 3.0756 | 1.1359 | 2.2327 |
| 10 | −0.0069 | −0.0100 | −0.0456 | −0.0166 | −0.0240 |
| 11 | 0.0853 | −0.0463 | 0.2155 | 0.1653 | −0.0897 |
| 12 | 0.0035 | −0.0110 | 0.3553 | 0.2852 | 0.9065 |
| 13 | 0.2184 | −0.0364 | 0.0255 | 0.0134 | −0.0022 |
| 14 | −0.0021 | −0.0241 | −0.5653 | 0.0011 | 0.0130 |
| 15 | −0.0241 | −0.0224 | −0.0667 | −0.0252 | −0.0234 |
| 16 | 0.2306 | 0.0183 | −0.0491 | −0.0520 | −0.0041 |
| Σ | −0.0138 | −0.0436 | −0.2620 | 0.0941 | 1.7665 |

FIG. 2 is the diagram showing the aberrations i.e. spherical aberation, astigmatism and distortion, of the lens as is given in Table 1.

As mentioned above, in accordance with the present invention, it is possible to prepare the objective lens wherein the operational distance is great, and the surface of the image is flat, and at the same time chromatic aberration, coma aberration, astigmatism, distortion or the like are highly corrected.

What is claimed is:

1. A microscope objective, comprising a front convergent group having a positive Petzval sum and a rear divergent group having a negative Petzval sum, the front group consisting of three convergent members, the first member ($L_1$) being a positive doublet consisting of a biconcave lens element cemented to a biconvex lens element, the second member ($L_2$) consisting of a biconvex lens element, and the third member ($L_3$) being a positive doublet consisting of a biconvex lens element cemented to a negative meniscus element, and the rear group comprising a first and a second divergent member, the first member consisting of a positive meniscus single lens element ($L_4$) having surfaces convex toward said front convergent group and a negative biconcave single lens element ($L_5$) located behind said positive meniscus single lens element, the second member consisting of a negative biconcave single lens element ($L_6$) and a positive biconvex single lens element ($L_7$) located behind said negative biconcave lens ($L_6$), said first and second members of said rear group act as a thick meniscus component and an air space between the two elements of said second member acts as meniscus air lens to correct the Petzval sum.

2. A microscope objective according to claim 1, wherein the numerical data is as follows:

Focal Length $f = 8.1417$ mm.

| R | d | $n_d$ | $\nu_d$ |
|---|---|---|---|
| | $d_0 = 5.0149$ | $n_1 = 1.0$ | |
| $R_1 = -46.9514$ | | | |
| | $d_1 = 1.15$ | $n_2 = 1.44628$ | 67.2 |
| $R_2 = 11.0132$ | | | |
| | $d_2 = 2.17$ | $n_3 = 1.43386$ | 94.9 |
| $R_3 = -8.6654$ | | | |
| | $d_3 = 0.69$ | $n_4 = 1.0$ | |
| $R_4 = 464.2827$ | | | |
| | $d_4 = 3.5$ | $n_5 = 1.71300$ | 53.9 |
| $R_5 = -13.5484$ | | | |
| | $d_5 = 0.64$ | $n_6 = 1.0$ | |
| $R_6 = 25.7478$ | | | |
| | $d_6 = 2.76$ | $n_7 = 1.79668$ | 45.3 |
| $R_7 = -10.4$ | | | |
| | $d_7 = 1.29$ | $n_8 = 1.80518$ | 25.5 |
| $R_8 = -21.8695$ | | | |
| | $d_8 = 0.05$ | $n_9 = 1.0$ | |
| $R_9 = 10.65$ | | | |
| | $d_9 = 1.99$ | $n_{10} = 1.71300$ | 53.9 |
| $R_{10} = 86.5722$ | | | |
| | $d_{10} = 0.41$ | $n_{11} = 1.0$ | |
| $R_{11} = -35.9346$ | | | |
| | $d_{11} = 2.42$ | $n_{12} = 1.80518$ | 25.5 |
| $R_{12} = 8.9307$ | | | |
| | $d_{12} = 2.9$ | $n_{13} = 1.0$ | |
| $R_{13} = -8.1972$ | | | |
| | $d_{13} = 1.3$ | $n_{14} = 1.74950$ | 35.0 |
| $R_{14} = 12.2654$ | | | |
| | $d_{14} = 1.47$ | $n_{15} = 1.0$ | |
| $R_{15} = 33.6828$ | | | |
| | $d_{15} = 2.89$ | $n_{16} = 1.79631$ | 40.9 |
| $R_{16} = -11.4213$ | | | |
| | $d_{16} = 153.2026$ | $n_{17} = 1.0$ | | where $R_1$ to $R_{16}$ represent the radii of curvature of the respective elements; $d_0$ represents the working distance; $d_1$ to $d_{15}$ represent the axial thicknesses of the respective elements and the air spaces between adjacent elements; $d_{16}$ represents the image distance from the last surface; $n_1$ to $n_{17}$ represent the refractive indices for the $d$-line of the spectrum of the glasses of the elements and the air spaces between adjacent lens elements, and $\nu d$ represents the Abbe numbers of the elements.

References Cited

UNITED STATES PATENTS 2,050,024   8/1936   Sonnefeld _____ 350—177

DAVID SCHONBERG, Primary Examiner

R. J. STERN, Assistant Examiner

U.S. Cl. X.R.

350—177, 214